United States Patent [19]

Buscall et al.

[11] Patent Number: 5,084,502
[45] Date of Patent: Jan. 28, 1992

[54] DISPERSIONS

[75] Inventors: Richard Buscall; Serena J. Williams, both of Cheshire, England

[73] Assignee: Imperial Chemical Industries PLC, London, England

[21] Appl. No.: 515,745

[22] Filed: Apr. 27, 1990

[30] Foreign Application Priority Data

Apr. 27, 1989 [GB] United Kingdom ................. 8909733

[51] Int. Cl.$^5$ ............................................. C08J 41/00
[52] U.S. Cl. ................................... 524/457; 524/458; 524/547; 524/558; 524/560
[58] Field of Search ................ 524/458, 547, 558, 560

[56] References Cited

U.S. PATENT DOCUMENTS 3,684,779 8/1972 Rapko .
4,239,671 12/1980 Fink et al. ........................... 526/304

FOREIGN PATENT DOCUMENTS 8802382 4/1988 PCT Int'l Appl. .

Primary Examiner—Joseph L. Schofer
Assistant Examiner—Jeffrey T. Smith
Attorney, Agent, or Firm—Cushman, Darby & Cushman

[57] ABSTRACT

A dispersion of solid inorganic particles in an aqueous medium which is stable to a range of pH's and added electrolyte wherein the dispersing agent is a water soluble copolymer derivable from a hydrophilic oligomer and certain defined olefinically unsaturated acids.

16 Claims, No Drawings

DISPERSIONS

The present invention relates to dispersions of inorganic particles and the preparation thereof.

Dispersions of solid inorganic particles in aqueous media which are stable to a range of pH's and temperature and a variety of additives have long been a desirable objective. We have now devised dispersing systems which are capable of achieving the aforementioned objectives.

According to a first aspect of the present invention there is provided a dispersion of inorganic particles in an aqueous medium wherein the dispersing agent comprises an effective amount of at least one water-soluble copolymer which is derived from:

Component A: a hydrophilic oligomer or polymer bearing an addition-polymerisable olefinically-unsaturated group which is present as an ester, amide or vinyl ether of the oligomer/polymer;

Component B: an olefinically-unsaturated compound capable of copolymerising with Component A and bearing
 i) a mineral acid group or
 ii) a dibasic carboxylic acid group or
 iii) a moiety bearing both a carboxylic acid group and a further group capable of involvement in hydrogen-bonding, therewith.

Optionally the copolymer is derived from a further component, in addition to Components A and B, i.e. Component C: a further olefinically unsaturated compound capable of copolymerising with Components A and B; and wherein, where component C is present, 5–75 mole % of the copolymer is provided by the residue of Component A, 25–95 mole % of the copolymer is provided by the residue of Component B and up to 20 mole % of the copolymer is provided by the residue of Component C. Where Component C is present in the copolymer, the thereof in the copolymer will be chosen such that it does not unduly reduce the miscibility of the copolymer in the aqueous medium.

Typically, the molecular weight of the copolymer is between 2,000 and 50,000.

As examples of the hydrophilic chain of Component A may be mentioned inter alia poly(vinyl-pyrrolidone), the preparation of which is more fully described in our UK 1,096,912, polyoxazolenes, or preferably a water soluble poly(alkylene glycol), more preferably polyethylene glycol (hereinafter referred to for convenience as PEG).

We do not exclude the possibility that where the hydrophilic chain of Component A comprises PEG, the PEG may include a small amount of a further polyalkylene glycol, e.g. propylene glycol, in the chain providing that it does not effect the solubility of the chain. For example where PEG of molecular weight about 1,000 is used it may include a few propylene glycol residues.

As examples of the addition-polymerisable group in Component A may be mentioned inter alia a vinyl ether, e.g. vinyl ether of PEG, or preferably an (alk) acrylate, e.g. a methacrylate, or more preferably an acrylate. Preferably the addition-polymerisable group is a terminal group on the oligomer or polymer backbone. However we do not exclude the possibility that the addition-polymerisable group may be intermediate the ends thereof, e.g. the di-PEG ester of maleic acid.

As examples of the terminal group of Component A distant the addition-polymerisable group thereof, particularly where Component A is derived from PEG, may be mentioned inter alia hydroxy, ester or preferably lower alkoxy bearing up to 4 carbon atoms or more preferably methoxy.

Typically, the molecular weight of Component A is between 500 and 5,000. The MW of Component A will often be chosen in the light of the size of the particles.

In Component B, the mineral acid group, where present, is preferably derived from phosphorus, although we do not exclude the possibility that it may be derived from sulphur. As examples of such mineral acid groups may be mentioned inter alia phosphinic

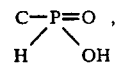

or preferably a dibasic acid, e.g. pyrophosphonic

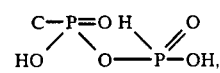

or preferably phosphonic acid

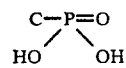

The aforementioned further group, where present, in Component B is preferably a hydroxyl group. However, we do not exclude the possibility that it may be, for example, an amide or amine.

Where Component B bears a carboxyl group it is preferred that the second carboxyl group or the further group is bonded to the same or adjacent carbon atoms. As examples of such Components may be mentioned inter alia allyl malonic acid and 2-acrylamidoglycollic acid. As preferred examples of Component B may be mentioned inter alia maleic acid, citraconic acid, itaconic acid, 2-acrylamidoglycollic acid, allyl-malonic acid, 1.2.3-butenetricarboxylic acid and vinyl phosphonic acid.

In the copolymer of the present invention, the acidic groups of Component B may be at least partially neutralised by a base such that a water-soluble or water-dispersible derivative thereof is produced.

The molar ratio of the pendent oligomeric/polymeric chains to acid groups in the copolymer is preferably between 1:1 and 1:9. It will be appreciated that where Component B is a dicarboxylic acid the molar ratio thereof in the copolymer is often about half what it would be if a monocarboxylic acid were used to give the same chain:acid ratio.

For example, for PEG of MW 500–5000 we would mention the following molar ratios of Component A:- Component B

| Component A | Component B | Molar Ratio |
|---|---|---|
| PEG: acrylate | Vinyl-phosphonic | 1:19 |
| " | Maleic | 1:1 |
| " | Hydroxy-acid? | 1:9 |

Where the aforementioned further group is present in Component B the ratio of carboxylic acid:further group is preferably 1:1. However, we do not exclude the possibility that alternative ratios may be used, e.g. Component B may be a mixture of acids, e.g. a dicarboxylic acid and a hydroxy-carboxylic acid.

As examples of Component C may be mentioned inter alia hydrophobic monomers, e.g. alkyl methacrylates; functionalised compounds, e.g. 4-vinylpyridine and dimethyl-aminoethyl methacrylate, etc; or preferably low MW monomers, e.g. methyl methacrylate.

We have found that (a) where Component C is hydrophobic, the molar % thereof in the copolymer is less than 10 such that the miscibility of the copolymer is not adversely affected; or (b) where Component C provides a minor amount of an acidic monomer, e.g. a sulphonated monomer, it could improve the solubility of the copolymer at low pH.

As preferred copolymers for use as dispersing agents in the dispersion according to the present invention may be mentioned inter alia 1:1 mole ratio of methoxy-PEG-acrylate and maleic acid (e.g. obtained by hydrolysis of the anhydride), optionally at least partially neutralised by base; and methoxy-PEG-acrylate and 2-acrylamido-glycollic acid wherein the molar concentration of 2-acrylamido-glycollic acid is between 50 and 95%.

As more preferred copolymers for use as dispersing agents in dispersion according to the present invention may be mentioned inter alia:

methoxy-PEG-methacrylate and vinyl phosphonic acid wherein the molar concentration of vinyl phosphonic acid is between 50 and 95%; and methoxy-PEG-acrylate, vinyl phosphonic acid and methyl methacrylate wherein the molar concentrations are, methyl methacrylate: less than 20%; vinyl phosphonic acid: 50-95%; and methoxy-PEG-acrylate: less than 50%.

The copolymers used in the present invention may typically be prepared by methods known to the skilled man. For example our European Patent Specification No. 0,182,523, the disclosure in which is incorporated herein by way of reference, discloses a plurality of methods for the preparation of such polymers.

According to a further aspect of the present invention there is provided a process for the preparation of a dispersion of a particulate inorganic solid which process comprises at least the step of contacting powder of the inorganic solid with a solution of a copolymer as defined in the first aspect of the present invention in an aqueous medium.

Preferably water is the major component of the dispersing medium in the dispersion according to the present invention. However, we do not exclude the possibility that the medium may comprise certain polar organic solvents in which the hydrophilic residue, e.g. PEG, is soluble.

Preferably the inorganic solid in the dispersion is a sparingly water-soluble salt, or a hydroxide, or one or more oxides, e.g. ferrites. We do not exclude the possibility that where the solid is a salt the anion therein may be derived from an organic acid or the cation from an organic base.

Typically, the particles of the particulate inorganic solid in the dispersion according to the present invention will be between 5 nm and 10 $\mu$m. For example, we have used particles of zinc sulphide of between 40 and 60 nm.

The concentration of the copolymer in the dispersion according to the present invention will be chosen in the light of the particle size particularly of the inorganic solid. For example, where the particle size is about 0.5$\mu$ the polymer concentration is typically about 2% w/w based on the inorganic solid.

Typically, dispersions according to the present invention are stable at pH 2-12.

The "concentration" of the particulate inorganic solid in the dispersion according to the present invention may be up to about 60% w/w, depending on the particular inorganic solid, and the size of the particles thereof, present in the dispersion.

According to a further aspect of the present invention there is provided a dispersion according to the first aspect of the present invention wherein the concentration of the inorganic solid is 60% v/v.

As examples of soluble electrolytes which may be present in the dispersion according to the present invention may be mentioned inter alia the halides, nitrates, phosphates and sulphates of, for example, sodium, barium, zinc and calcium. The concentration of the electrolyte, where present in the dispersion, may often be up to about 2 Molar for chlorides and nitrates and about 0.1 Molar for certain oxyanion salts, e.g. sulphates and phosphates.

According to a further aspect of the present invention there is provided a dispersion according to the first aspect of the present invention wherein the aqueous medium comprises a soluble electrolyte.

The dispersion according to the present invention may be used in inter alia the pigment, filler and catalyst arts.

From Tables 3-9, as hereinafter described, it can be seen that the copolymers hereinbefore described are capable of dispersing certain solid inorganic particles in an aqueous medium over a wide range of conditions. Typically, the copolymers stabilise the dispersions of inorganic particles at a range of pH's and in the presence of a variety of additives including high electrolyte concentrations, e.g. 2M NaCl. However, commercially available dispersing agents, e.g. Calgon and lignosulphonate, stabilise dispersions of inorganic particles in an aqueous medium at only certain pH's and rarely in the presence of significant electrolyte concentrations.

The present invention is further illustrated by reference to the following Examples.

In Tables 3-9 hereinafter, the symbols therein have the following meanings

CT: Comparative Test with no dispersing agent;
D: Deflocculated fluid dispersion was obtained;
F: A flocculated viscous dispersion was obtained;
Calgon: a sodium polyphosphate;
Lignosuphonate: "Reax" 15B ex Westvaco; and
N40: Polyacrylic acid "Dispex" N40 ex Allied Colloids.

EXAMPLES 1-9

These Examples illustrate the preparation of copolymers useful as dispersing agents in the present invention.

General Procedure

The polymerisations were carried out in a glass flanged flask fitted with a stirrer, reflux condenser and with provision for the introduction of an inert gas, e.g. nitrogen. The flask was charged with a first portion (as indicated in Table 1) of the solvent and heated in an oil bath to 85° C. The monomers and inhibitor were dissolved in a second portion of the solvent and fed into the heated flask over a one hour period, using a dropping funnel. The total reaction mixture was stirred at 85° C. for 23 hours, i.e. the total reaction time was 24 hours. The reaction mixture was cooled and the polymer was isolated by slowly pouring the reaction mixture into a five-fold excess of diethylether. The resultant polymer was filtered and dried in a vacuum oven at 30° C. for at least 8 hours. The specific monomers and conditions used in these Examples are shown in Table 1.

diethyl ether. The polymer, which precipitated, was filtered and dried in a vacuum oven at 30° C. for at least 8 hours. The specific monomers and conditions used in these Examples are shown in Table 2.

TABLE 2

| | | Reaction Mixture | | | | |
|---|---|---|---|---|---|---|
| EXAMPLE NO. | First Portion IMS (Grams) | Component A Hydrophilic Component (Grams) | Component B Acidic Component (Grams) | Component C Termonomer (Grams) | Initiator: (Grams) | Second Portion IMS (Grams) |
| 10 | 20 | A1 (20) | AAG (5.6) | — | 0.51 | 82.4 |
| 11 | 24 | A1 (20) | AAG (10) | MMA (1.0) | 0.62 | 100 |
| 12 | 10 | A1 (10) | AM (3.0) | — | 0.26 | 29 |
| 13 | 15 | A1 (13) | B (8.5) | — | 0.43 | 49.5 |

A1, AAG and MMA have the meanings ascribed to them in Table 1;
AM: Allylmalonic acid;
B: Butene-1,2,3-tricarboxylic acid

TABLE 1

| | | Reaction Mixture | | | | |
|---|---|---|---|---|---|---|
| EXAMPLE NO. | Solvent First Portion (Grams) | Component A Hydrophilic Component (Grams) | Component B Acidic Component (Grams) | Component C Termonomer (Grams) | Initiator α-azo-isobutyro-nitrile: (Grams) | Solvent second portion (Grams) |
| 1 | T (30) | A1 (95) | M (5) | — | 2 | 120 |
| 2 | D (30) | A2 (10.9) | V (20) | — | 0.61 | 73 |
| 3 | D (15) | A1 (26) | V (8.64) | MMA (1) | 0.71 | 68.2 |
| 4 | T (10) | A1 (16) | I (1.4) | — | 0.35 | 30 |
| 5 | T (12) | A1 (26.3) | C (1.5) | — | 0.35 | 30 |
| 6 | D (5.6) | A1 (10.4) | V (8.21) | — | 0.37 | 13 |
| 7 | T (15) | A1 (30) | M (1.5) | S (0.2) | 0.63 | 30 |
| 8 | T (8.0) | A1 (18.5) | M (1.0) | VP (1.0) | 0.41 | 40 |
| 9 | D (15) | A1 (26) | V (2.2) | — | 0.57 | 51.0 |

T: Toluene;
D: Dimethyl formamide;
A1: Methoxy-PEG-acrylate (MW 2600);
A2: Decaethylene glycol monomethacrylate;
M: Maleic anhydride;
V: Vinyl phosphonic acid;
I: Itaconic anhydride;
MMA: Methyl methacrylate;
AAG: Acrylamidoglycollic acid.
C: Citraconic acid
S: Styrene
VP: Vinyl Pyridine

EXAMPLES 10-13

These Examples illustrate the preparation of further copolymers useful as dispersing agents in the present invention.

The general procedure of Examples 1-9 was repeated except that (a) the reaction was carried out in industrial methylated spirit (IMS), (b) the reaction mixture was adjusted to pH 8.0 using 1M NaOH solution, before charging it to the reaction vessel (c) the initiator was 4,4-azo-bis-4-cyanovaleric acid instead of α-azo-isobutyronitrile and (d) the reaction was carried out at 75° C. instead of 85° C. The product was isolated by removing about 50-60% of the IMS by vacuum distillation and pouring the residue into a five-fold excess of

EXAMPLES 14-32

These Examples illustrate the preparation of dispersions according to the present invention wherein the inorganic particles comprise an oxide and/or hydroxide.

General Procedure

The copolymer (2% w/w on inorganic material) was dissolved in distilled water and the specific inorganic particles indicated below were added to the solution to produce a dispersion containing 30% by volume of inorganic particles. This was stirred thoroughly by hand and then mixed for one minute using an homogeniser. The pH of the dispersion was measured and adjusted to pH 2 using 0.1M HCl(aqueous), or pH 10 using 0.1M NH4OH(aqueous)as shown in Tables 3-5.

Where the aqueous medium comprised a salt solution the copolymer was dissolved in the salt solution before adding the inorganic particles.

In comparative Tests, the viscosity of the dispersions containing the copolymers was compared visually to a blank and to dispersions containing commercially available dispersing agents for inorganic solids. The results are shown in Tables 3-5.

TABLE 3

| Example No | Polymer Prepared in Ex No | Salt Concentration | Titania pH2 | pH7 | pH10 |
|---|---|---|---|---|---|
| CT | Blank | — | F | F | D |
| 14 | 1 | — | D | D | D |
| 15 | 1 | 2 M NaCl | D | D | D |
| 16 | 2 | — | D | D | D |
| 17 | 3 | — | D | D | D |
| 18 | 3 | 2 M NaCl | D | D | D |
| 19 | 10 | — | D | D | D |
| 20 | 11 | — | D | D | D |
| 21 | 12 | — | D | D | D |
| CT | N40 | — | F | D | D |
| CT | N40 | 2 M NaCl | F | D | D |
| CT | Calgon | — | F | D | D |
| CT | Calgon | 1 M NaCl | F | F | F |

TABLE 4

| Example No | Polymer Prepared in Ex No | Salt Concentration | Alumina pH2 | pH7 | pH10 |
|---|---|---|---|---|---|
| CT | Blank | — | F | F | F |
| 22 | 1 | — | D | D | D |
| 23 | 1 | 2 M NaCl | D | D | D |
| 24 | 3 | — | D | D | D |
| 25 | 3 | 2 M NaCl | D | D | D |
| 26 | 4 | — | D | D | D |
| 27 | 11 | — | D | D | D |
| 28 | 12 | — | D | D | D |
| CT | N40 | — | F | D | D |
| CT | N40 | 2 M NaCl | F | D | D |
| CT | Lignosulphonate | — | F | D | D |
| CT | Lignosulphonate | 1 M NaCl | F | F | F |
| CT | Calgon | — | D | D | D |
| CT | Calgon | 1 M NaCl | F | F | F |

TABLE 5

| Example No | Polymer from | Concentration Salt | Iron Oxide[a] pH 2.0 | pH 7.0 | pH 11.0 |
|---|---|---|---|---|---|
| CT | Blank | — | F | F | F |
| 29 | Ex 1 | — | D | D | D |
| 30 | Ex 1 | 2 M NaCl | D | D | D |
| 31 | Ex 6 | — | D | D | D |
| 32 | Ex 6 | 2 M NaCl | D | D | D |
| CT | N40 | — | F | D | D |
| CT | N40 | 2 M NaCl | F | D | D |

[a] 10% by volume; 52.4% w/w; precipitated $Fe_2O_3$ ex B.D.H. Ltd

EXAMPLES 33-54

These Examples illustrate the preparation of dispersions according to the present invention wherein the inorganic particles comprise a salt.

The general procedure of Examples 14-32 was repeated except that salts were used instead of oxides/hydroxides. The results are shown in Tables 6-8.

TABLE 6

| Example No | Polymer Prepared in Ex No | Salt Concentration | Barium Sulphate pH7 |
|---|---|---|---|
| CT | Blank | — | F |
| 33 | 1 | 2 M NaCl | D |
| 34 | 2 | — | D |
| 35 | 2 | 2 M NaCl | D |
| 36 | 3 | 2 M NaCl | D |
| 37 | 5 | 2 M NaCl | D |
| 38 | 5 | 1 M $BaCl_2$ | D |
| 39 | 4 | — | D |
| 40 | 11 | — | D |
| 41 | 12 | — | D |
| CT | Lignosulphonate | — | D |
| CT | Lignosulphonate | 1 M NaCl | F |
| CT | Calgon | — | D |
| CT | Calgon | 1 M NaCl | F |

TABLE 7

| Example No | Polymer | Salt Concentration | Zinc Sulphide pH7 |
|---|---|---|---|
| CT | Blank | — | F |
| 42 | 1 | 2 M NaCl | D |
| 43 | 1 | 1 M $Zn(NO_3)_2$ | D |
| 44 | 2 | 2 M NaCl | D |
| 45 | 2 | 1 M $Zn(NO_3)_2$ | D |
| 46 | 3 | 2 M NaCl | D |
| 47 | 9 | 2 M NaCl | D |
| 48 | 4 | 2 M NaCl | D |
| 49 | 10 | — | D |
| 50 | 11 | — | D |
| CT | Calgon | — | D |
| CT | Calgon | 1 M NaCl | F |

TABLE 8

| Example No | Polymer from | Salt Concentration | Calcium carbonate[a] pH 6.0 | pH 8.0 | pH 11 |
|---|---|---|---|---|---|
| CT | Blank | — | F | F | F |
| 51 | 1 | — | D | D | D |
| 52 | 1 | 1 M $CaCl_2$ | D | D | D |
| 53 | 13 | — | D | D | D |
| 54 | 13 | 1 M $CaCl_3$ | D | D | D |
| CT | Calgon | — | D | D | D |
| CT | " | 1 M $CaCl_2$ | F | F | F |
| CT | N40 | — | F | D | D |
| CT | " | 1 M $CaCl_2$ | F | F | F |

[a] 30% by volume, "Polycarb S" ex E.C.C.

EXAMPLES 55-57

These Examples illustrate the preparation of dispersions according to the present invention wherein the aqueous medium comprises a mixture of a polar organic liquid and water.

The general procedure of Examples 14-32 was repeated except that the liquid comprised 50% w/w water and 50% w/w industrial methylated spirit. A sample of the polymer prepared in Examples 1 was used as the dispersing agent.

The results are shown in Table 9 from which it can be seen that the copolymers defined in claim 1 of the present invention are capable of dispersing certain solid inorganic particles in mixtures of water and polar organic solvents.

TABLE 9

| Example No | Inorganic Particles | pH 2.0 | 7.0 | 11 |
|---|---|---|---|---|
| 55 | Titania | D | D | D |
| CT | " | F | F | F |
| 56 | Alumina | D | D | D |
| CT | " | F | F | F |

TABLE 9-continued

| Example No | Inorganic Particles | pH 2.0 | pH 7.0 | pH 11 |
|---|---|---|---|---|
| 57 | BaSO₄ | a | D | a |
| CT | " | a | F | a | a: Not determined
CT: Comparative test with no dispersing agent

We claim:

1. A dispersion of inorganic solid particles in an aqueous medium wherein the dispersing agent comprises an effective amount of at least one water soluble copolymer comprising repeating units which are derived from:

Component A: a hydrophilic oligomer or polymer bearing an addition-polymerisable olefinically-unsaturated group which is present as an ester, amide or vinyl ether of the oligomer/polymer;

Component B: an olefinically-unsaturated compound capable of copolymerising with Component A and bearing
   i) a mineral acid group or
   ii) a dibasic carboxylic acid group or
   iii) a moiety bearing both a carboxylic acid group and a further group capable of involvement in hydrogen bonding therewith.

2. A dispersion as claimed in claim 1 wherein in Component B, where the carboxylic acid group and the said further group are present, or where it is a dicarboxylic acid, both functional groups are borne on the same or adjacent carbon atoms.

3. A dispersion as claimed in claim 1 wherein the copolymer further comprises the residue of an olefinically unsaturated compound capable of copolymerising with Components A and B; and wherein 5-75 mole % of the copolymer is provided by the residue of Component A, 25-95 mole % thereof is provided by the residue of Component B and up to 20 mole % thereof is provided by the residue of Component C.

4. A dispersion as claimed in claim 1 wherein in the copolymer the hydrophilic oligomer or polymer is derived from a water-soluble poly(alkylene glycol).

5. A dispersion as claimed in claim 1 wherein in the copolymer the addition-polymerisable olefinically unsaturated group in Component A is an (alk)acrylate.

6. A dispersion as claimed in claim 1 wherein in the copolymer the addition-polymerisable olefinically unsaturated group in Component A is a terminal group on the oligomer or polymer chain.

7. A dispersion as claimed in claim 6 wherein in the copolymer the terminal group of Component A distant from the addition polymerisable group is a lower alkoxy group.

8. A dispersion as claimed in claim 1 wherein in the copolymer Component B contains a dibasic mineral acid group.

9. A dispersion as claimed in claim 1 wherein in the copolymer Component B comprises a dicarboxylic acid group.

10. A dispersion as claimed in claim 1 wherein in the copolymer the further group, where present in Component B, is hydroxyl.

11. A dispersion as claimed in claim 1 wherein the inorganic solid particles comprise titania, alumina, iron oxide, barium sulphate, zinc sulphide, or calcium carbonate.

12. A dispersion as claimed in claim 8 wherein the copolymer is a methoxy-PEG acrylate and vinyl phosphonic acid copolymer wherein the molar concentration of vinyl phosphonic acid is 50-95%; or a methoxy-PEG-acrylate, vinyl phosphonic acid, methyl methacrylate copolymer wherein the molar concentrations are methyl methacrylate: less than 20%; vinyl phosphonic acid: 50-95%; and methoxy—PEG—acrylate: less than 50%.

13. A copolymer as defined as claim 12.

14. A process for the preparation of a dispersion of a particulate inorganic solid which process comprises at least the step of contacting a powder of the solid with a solution of a copolymer as defined in claim 1.

15. A dispersion as claimed in claim 1 wherein the concentration of the inorganic solid is up to about 60% w/w.

16. A dispersion as claimed in claim 1 wherein the aqueous medium comprises a soluble electrolyte.

* * * * *